United States Patent
Huang (10) Patent No.: US 7,341,396 B2
(45) Date of Patent: Mar. 11, 2008

(54) CONNECTION DEVICE OF WINDSHIELD WIPER OF MOTOR VEHICLE

(76) Inventor: Shih Hsien Huang, Jengshin St, Kaohsiung (TW) 813

( * ) Notice: Subject to any disclaimer, the term of this patent is extended or adjusted under 35 U.S.C. 154(b) by 60 days.

(21) Appl. No.: 10/699,840

(22) Filed: Nov. 4, 2003

(65) Prior Publication Data

US 2005/0091793 A1 May 5, 2005

(51) Int. Cl.
*F16B 21/00* (2006.01)

(52) U.S. Cl. ............ 403/326; 15/250.31; 15/250.33; 15/250.32

(58) Field of Classification Search .............. 403/329, 403/226, 397, DIG. 14, 326, 330; 24/489, 24/457; 15/250.31, 250.32, 250.33; D12/220
See application file for complete search history.

(56) References Cited

U.S. PATENT DOCUMENTS

| | | | | |
|---|---|---|---|---|
| 4,670,934 A | * | 6/1987 | Epple et al. | 15/250.32 |
| D357,891 S | * | 5/1995 | Lee | D12/220 |
| 5,611,103 A | * | 3/1997 | Lee | 15/250.32 |
| 5,632,059 A | * | 5/1997 | Lee | 15/250.32 |
| 2004/0244137 A1 | * | 12/2004 | Poton | 15/250.32 |

* cited by examiner

*Primary Examiner*—Daniel P. Stodola
*Assistant Examiner*—Daniel Mills
(74) *Attorney, Agent, or Firm*—Bacon & Thomas, PLLC (57) ABSTRACT

An automotive windshield wiper connection device has a body which is provided with a hook-type elastic piece, an insertion-type elastic piece, a pin hole, and a locking slot. The hook-type elastic piece is provided thereover with a rotary cover pivoted therewith for engaging a hook-type rocking arm. The insertion elastic piece is provided thereover with an insertion hole for engaging an insertion-type rocking arm. The connection device is thus compatible with the windshield wiper rocking arms of motor vehicles of various models.

1 Claim, 14 Drawing Sheets

*Prior Art*

CONNECTION DEVICE OF WINDSHIELD WIPER OF MOTOR VEHICLE

FIELD OF THE INVENTION

The present invention relates to a connection device which is adapted to connect the arm of windshield wipers of motor vehicles of various models.

BACKGROUND OF THE INVENTION

Figure 1:
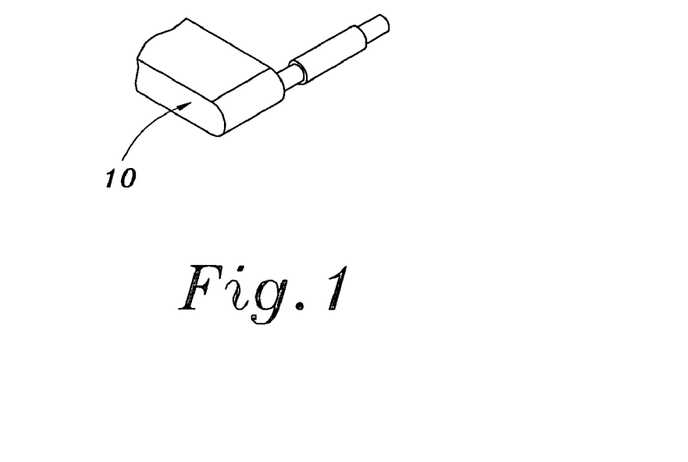
FIG. 1 shows a perspective view of a pin type windshield wiper connector.
Figure 2:
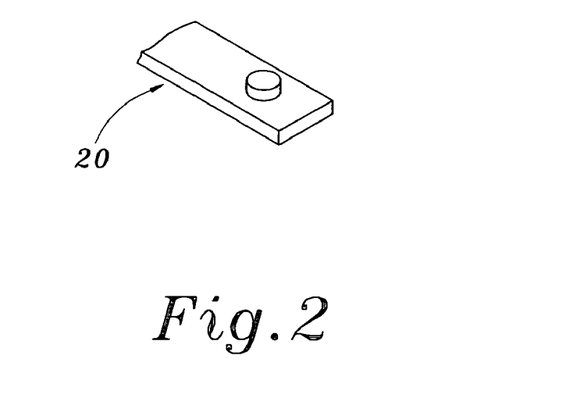
FIG. 2 shows a perspective view of a bayonet type windshield wiper connector.
Figure 3:
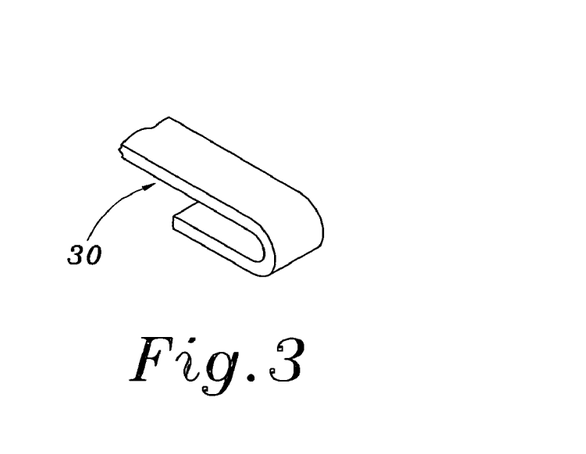
FIG. 3 shows a perspective view of a hook type windshield wiper connector.
Figure 4:
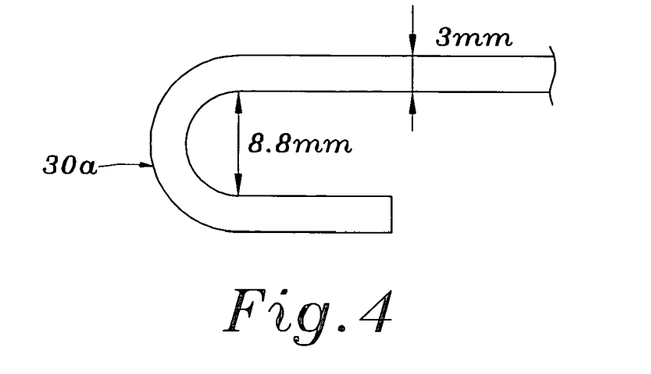
FIG. 4 shows a schematic view of the hook type windshield wiper connector having the same thickness and a small curved end.
Figure 5:
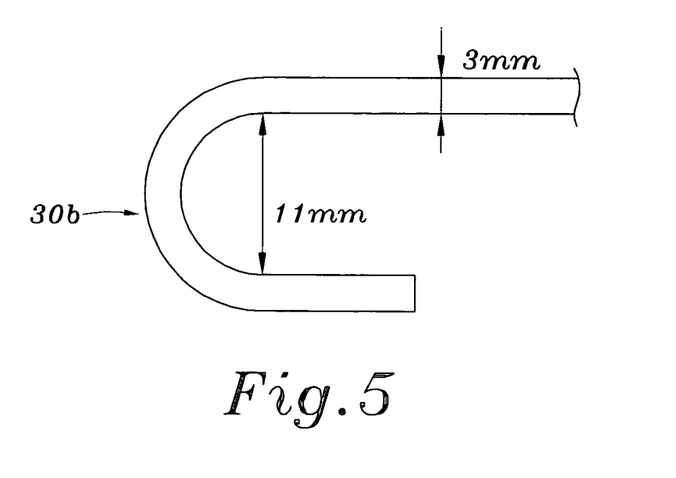
FIG. 5 shows a schematic view of the hook type windshield wiper connector having the same thickness and a large curved end.
Figure 6:
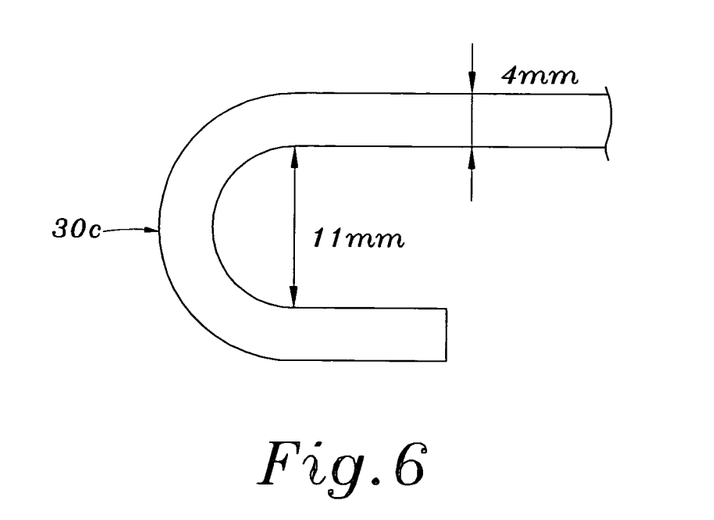
FIG. 6 shows a schematic view of the hook type windshield wiper connector having a large thickness and a large curved end.
Figure 7:
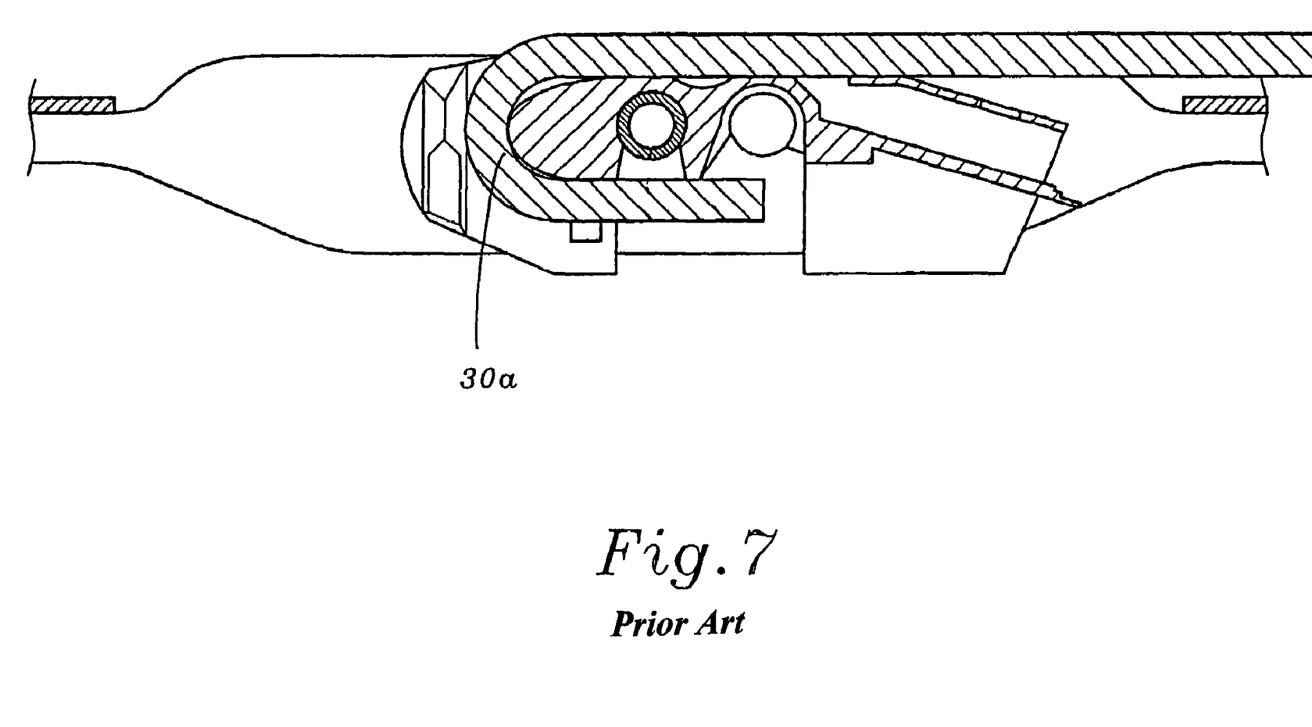
FIG. 7 is FIG. 4 of the specification of the U.S. Pat. No. 6,332,236.
Figure 8:
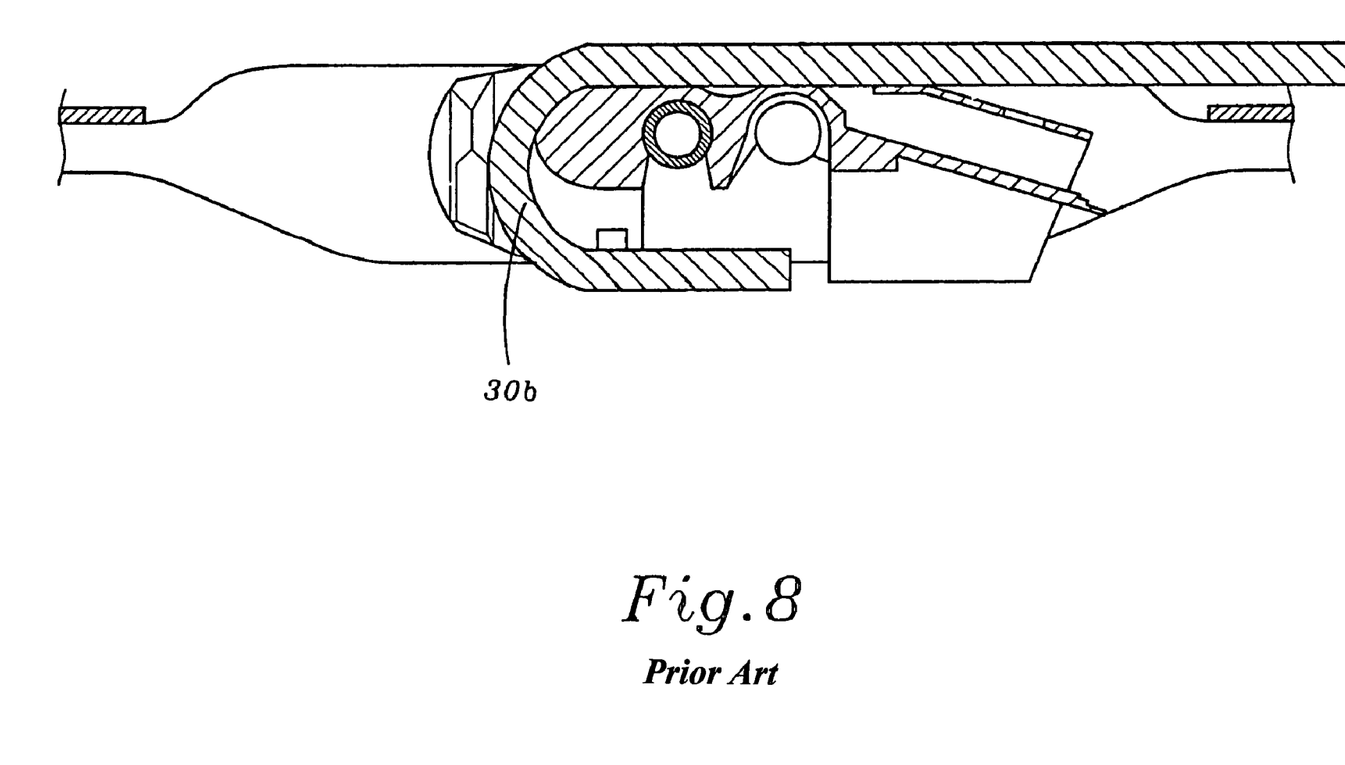
FIG. 8 is FIG. 5 of the specification of the U.S. Pat. No. 6,332,236.
Figure 9:
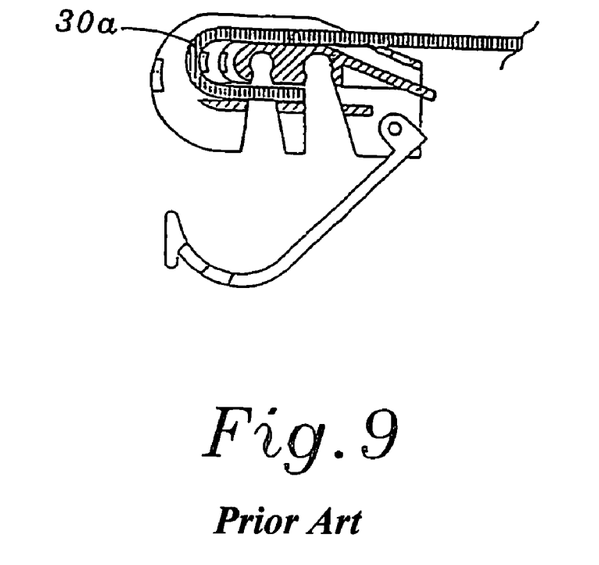
FIG. 9 is FIG. 6b of the specification of the U.S. Pat. No. 5,611,103.
Figure 10:
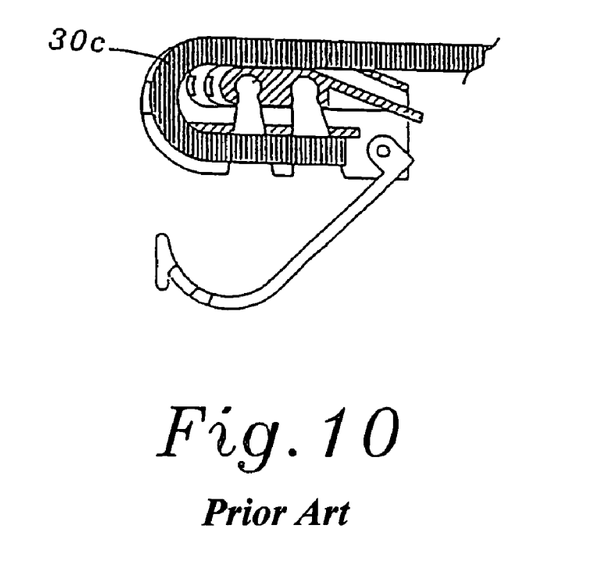
FIG. 10 is FIG. 6a of the specification of the U.S. Pat. No. 5,611,103.
Figure 11:
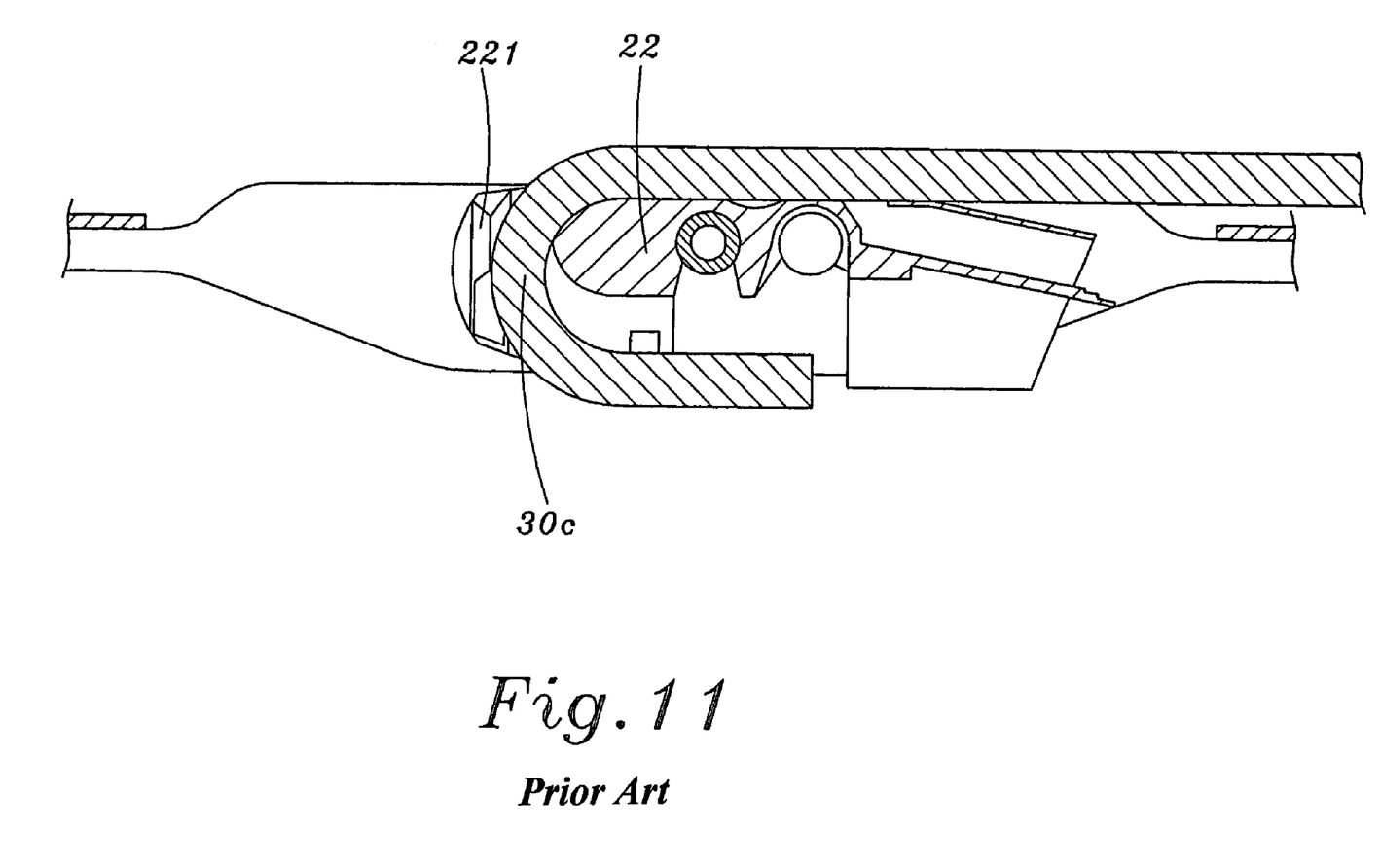
FIG. 11 shows a schematic view of an association of the device of the U.S. Pat. No. 6,332,236 and the hook type windshield wiper connector having a large thickness and a large curved end.

There are three conventional types of the automotive windshield wiper connector which include a pin type 10, as shown in FIG. 1, a bayonet type 20, as shown in FIG. 2, and a hook type 30, as shown in FIG. 3. The U.S. Pat. Nos. 5,611,103 and 6,332,236 disclose respectively a windshield wiper arm connector which is adapted to the pin type 10 and the bayonet type 20, but not to the hook type 30. As far as the hook type 30 is concerned, there are three specifications which include a hook-type connector 30a, as shown in FIG. 4, a hook-type connector 30b, as shown in FIG. 5, and a hook-type connector 30c, as shown in FIG. 6. The hook-type connector 30a has a thickness of 3 mm and an inner diameter of 8.8 mm of a curved end. The hook-type connector 30b has a thickness of 3 mm and a curved end whose inner diameter is 11 mm. The third hook-type connector 30c has a thickness of 4 mm and a curved end with an inner diameter of 11 mm. The windshield wiper arm connector of the U.S. Pat. No. 6,332,236 is adapted to the first hook-type connector 30a specification and the second hook-type connector 30b specification, as illustrated in FIGS. 7 and 8, which are respectively corresponding to FIGS. 4 and 5 of the specification of the U.S. Pat. No. 6,332,236. The windshield wiper arm connector of the U.S. Pat. No. 5,611,103 is designed to cooperate with the first hook-type connector 30a specification and the third hook-type connector 30c specification, as illustrated in FIGS. 9 and 10, which are respectively corresponding to FIGS. 6b and 6a of the specification of the U.S. Pat. No. 5,611,103. The windshield wiper arm connector of the U.S. Pat. No. 6,332,236 is incompatible with the third hook-type connector 30c whose thickness is excessive, as illustrated in FIG. 11. As illustrated in FIGS. 4 and 5 of the patent specification of the U.S. Pat. No. 6,332,236, the third hook-type connector 30c is located beyond the distance between the front edge of the arcuate cross portion 22 and the stop block 221, thereby causing the end of the third hook-type connector 30c to press against the stop block 221, which is thus deformed.

Figure 12:
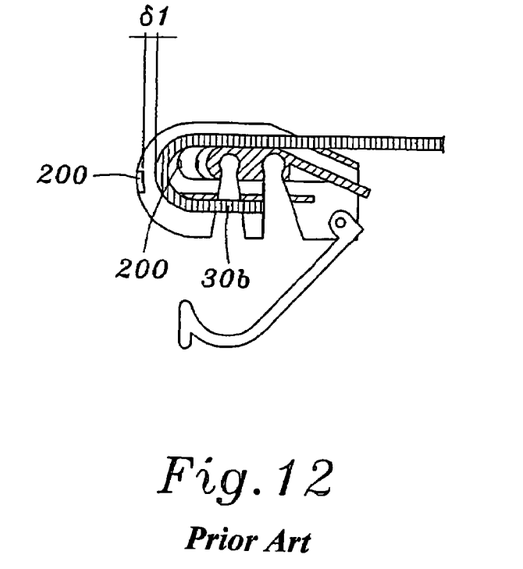
FIG. 12 shows a schematic view of an association of the device of the U.S. Pat. No. 5,611,103 and the hook type windshield wiper connector having the same thickness and the large curved end.
Figure 13:
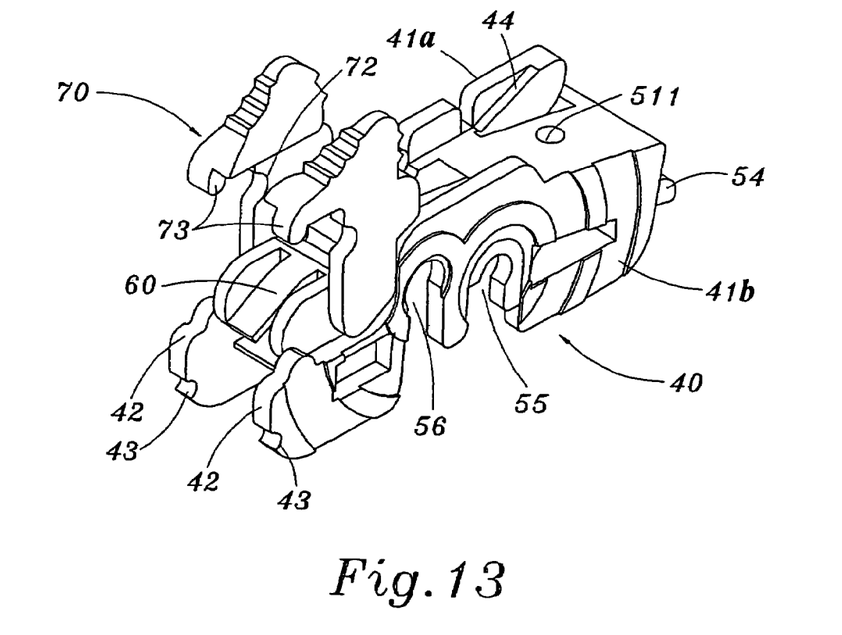
FIG. 13 shows a perspective view of the present invention.
Figure 14:
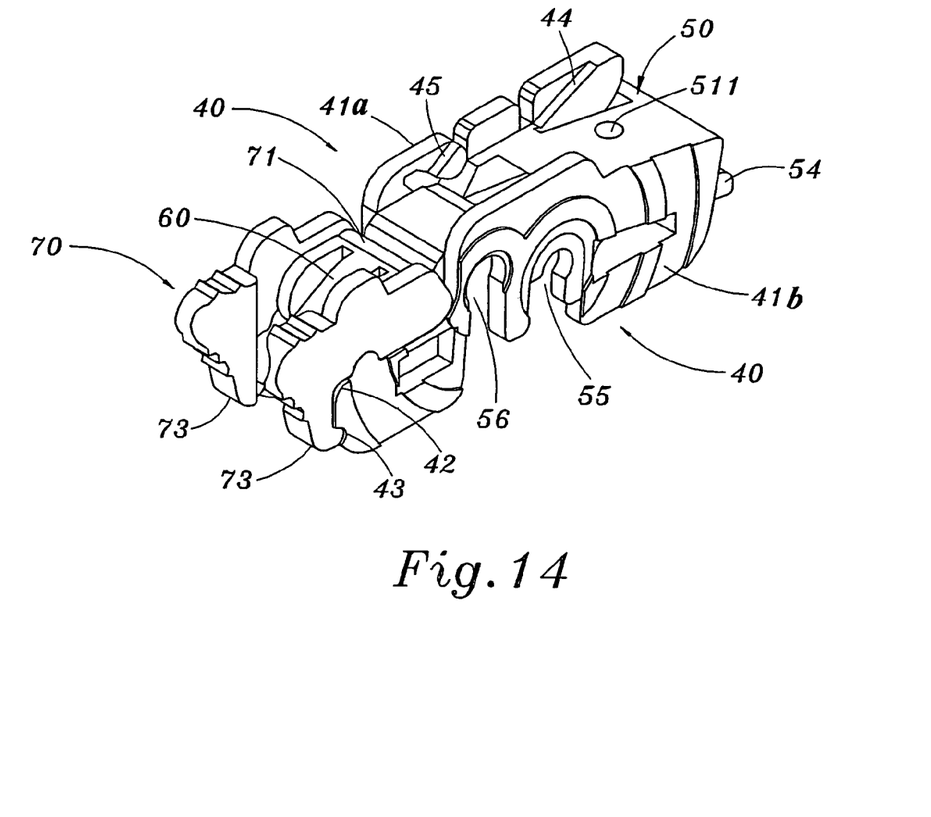
FIG. 14 shows another perspective view of the present invention.
Figure 15:
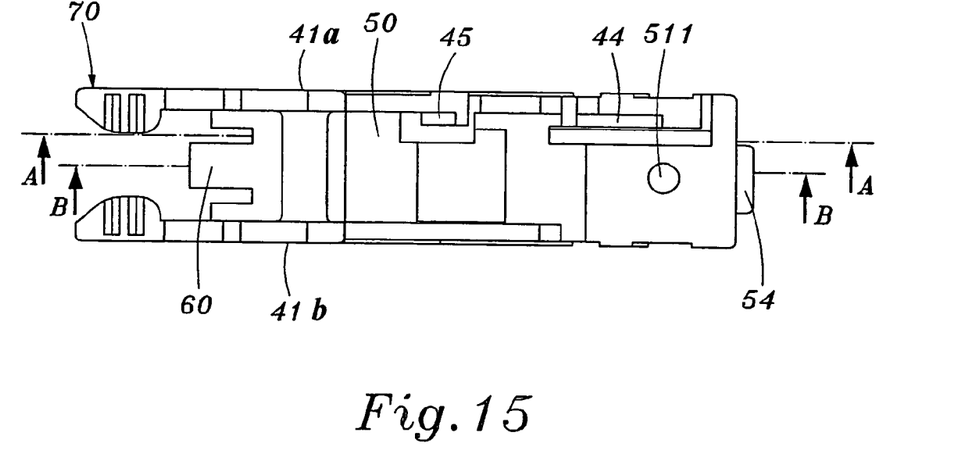
FIG. 15 shows a top plan view of the present invention as shown in FIG. 14.
Figure 16:
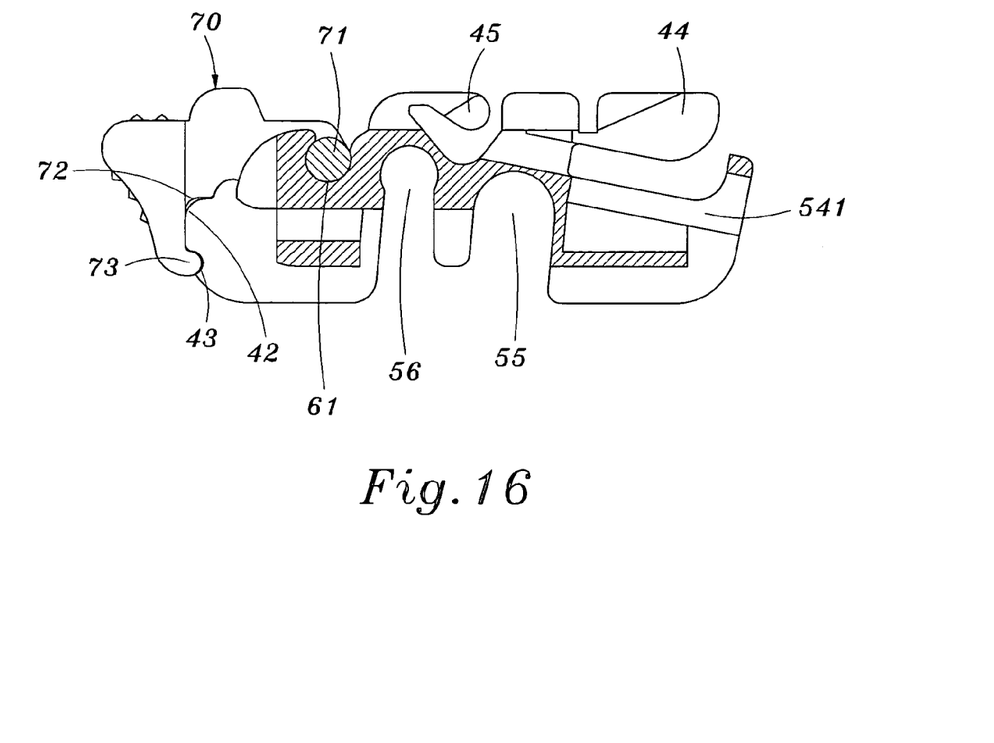
FIG. 16 shows a sectional view taken along the direction indicated by a line A-A as shown in FIG. 15.
Figure 17:
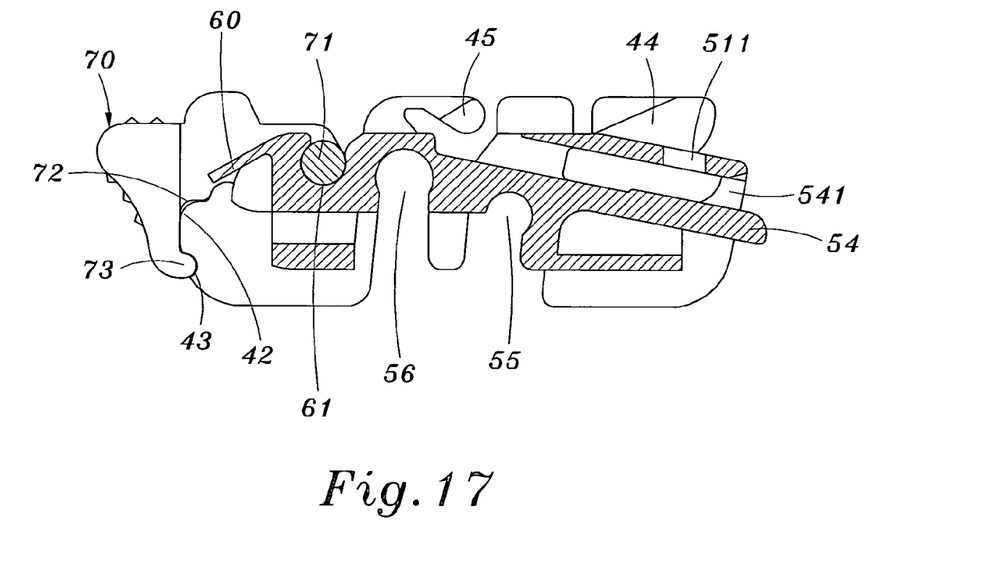
FIG. 17 shows a sectional view taken along the direction indicated by a line B-B as shown in FIG. 15.

The windshield wiper connector of the U.S. Pat. No. 5,611,103 is incompatible with the second hook-type connector 30b in view of the fact that the thickness of the second hook-type connector 30b is inadequate, as illustrated in FIG. 12. As a result, the hooked end of the connector 30b can not reach the stop block 200 of the front end of the windshield wiper connector. The windshield wiper connector can not be therefore held securely between the front end stop block 200 and the stop block 200 located at the front end of the midsection. In another words, there is a void δ1 between the second hook-type connector 30b and the front end stop block 200, as illustrated in FIG. 12.

It is therefore readily apparent that the windshield wiper connectors disclosed in the U.S. Pat. Nos. 5,611,103 and 6,332,236 are limited in application.

SUMMARY OF THE INVENTION

The primary objective of the present invention is to provide a windshield wiper connector free of the deficiencies of the prior art counterparts described above.

The windshield wiper connector of the present invention has a body which is provided at one end with a hook-type elastic piece, at other end with an insertion-type elastic piece, and in a midsection with a pin hole and a locking slot. The hook-type elastic piece is provided with a rotary cover, whereas the insertion-type elastic piece is provided with an insertion hole. The rotary cover is engageable with a hook-type rocking arm while the insertion-type elastic piece is engageable with an insertion-type rocking arm. As a result, the windshield wiper connector of the present invention is compatible with the existing windshield wipers having rocking arms of various specifications.

The features and the advantages of the present invention will be more readily understood upon a thoughtful deliberation of the following detailed description of the present invention with reference to the accompanying drawings.

DETAILED DESCRIPTION OF THE INVENTION

As shown in FIGS. 13-17, an automotive windshield wiper connection device 40 of the present invention has two side plates 41a, 41b parallel to each other, and a connection portion 50 for connecting the two side plates 41a, 41b. The two side plates 41a, 41b are provided in the center of a bottom thereof with a pin hole 55 and a locking slot 56. The connection portion 50 is provided at one end with an insertion-type elastic piece 54, and at other end with a hook-type elastic piece 60. The insertion-type elastic piece 54 is provided with an insertion hole 541 over which a retaining hole 511 is located. One side plate 41a is provided with a first elastic pad located at one side of the retaining hole 51. The side plate 41a is provided with a second elastic pad 45 located over a place between the pin hole 55 and the locking slot 56. Elastic pads 44 and 45 extend above the connection portion 50 in an un-flexed condition.

The connection portion 50 located over the hook-type elastic piece 60 is provided with a cover fixing slot 61. The side plates 41 located under the hook-type elastic piece 60 is provided with a protrusion 42 and a recess 43. A cover 70 is provided with a pin 71 by which the cover 70 is pivotally engaged to the cover fixing slot 61. The cover 70 is provided with a strength retaining point 72 and a retaining point 73 corresponding respectively to the protrusion 42 and the recess 43.

Figure 18:
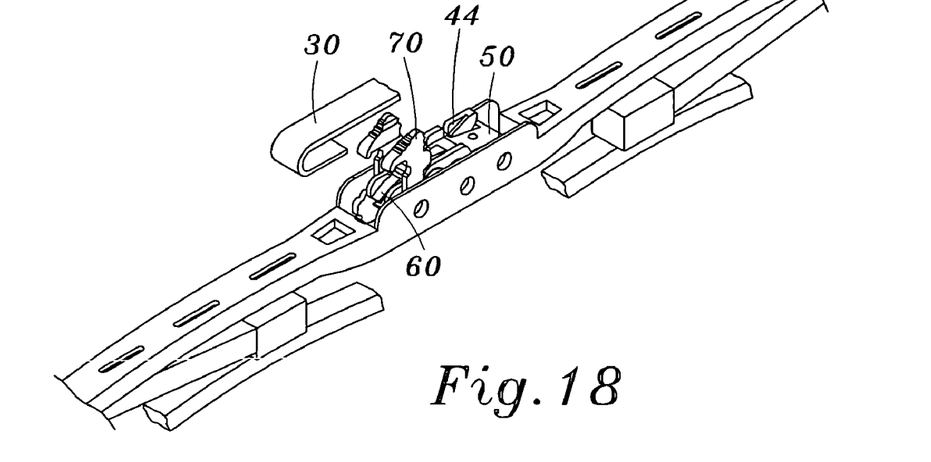
FIG. 18 shows a schematic view of the present invention along with a hook-type windshield wiper connector.
Figure 19:
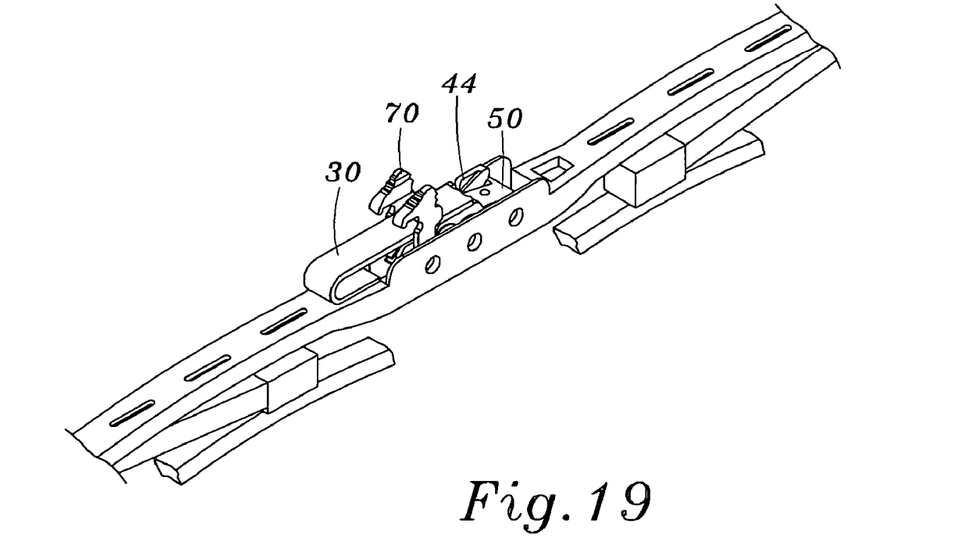
FIG. 19 shows a schematic view of the present invention engaging the hook-type windshield wiper connector as shown in FIG. 18.
Figure 20:
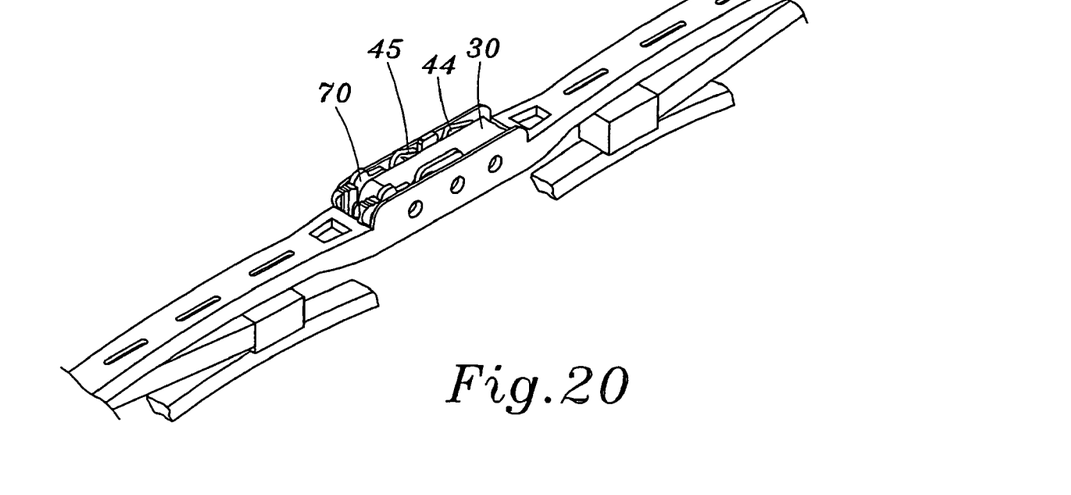
FIG. 20 shows a schematic view of a full engagement of the present invention with the hook-up windshield wiper connector as shown in FIG. 19.

As shown in FIGS. 18-20, the present invention is engaged with the hook-type windshield wiper connector 30 such that the elastic piece 60 comes in contact with the connector 30, and the elastic piece 60 is deformed to produce an outward elastic force by which the hooked portion of the connector 30 is securely held. As the cover 70 is turned, the strength retaining point 72 and the retaining point 73 are securely engaged with the protrusion 42 and the recess 43.

Figure 21:
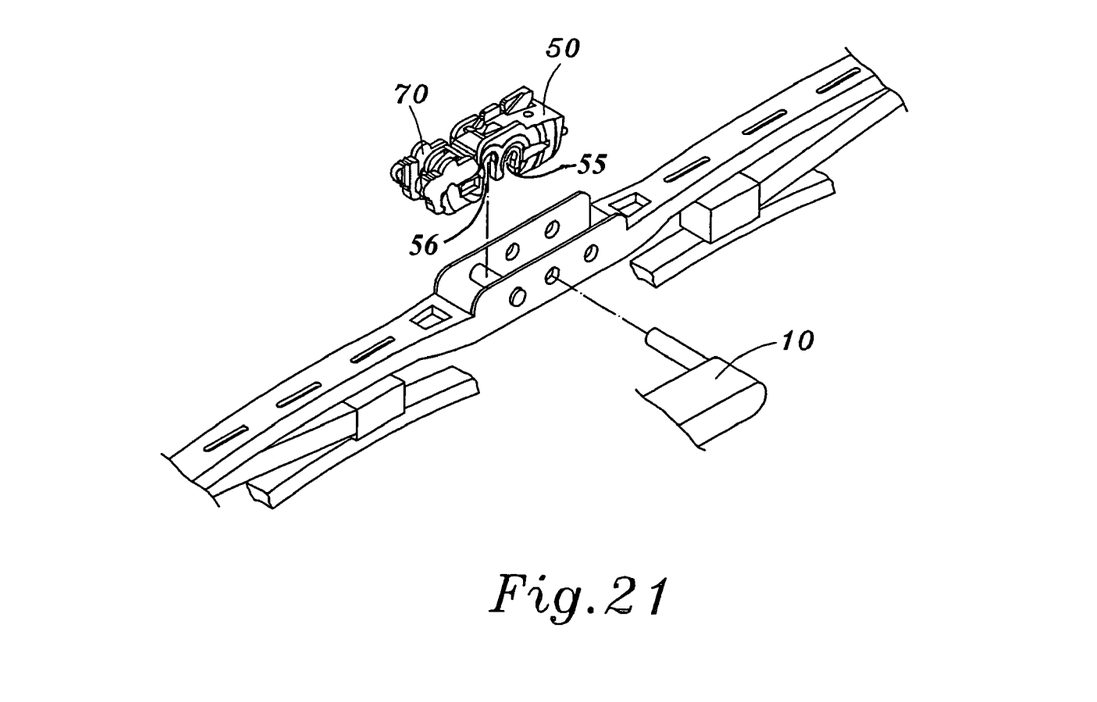
FIG. 21 shows a schematic view of the present invention along with a pin-type windshield wiper connector.

As shown in FIG. 21, the pin hole 55 and the locking slot 56 of the connection portion 50 of the present invention are compatible with the pin-type connector 10 of various diameters.

Figure 22:
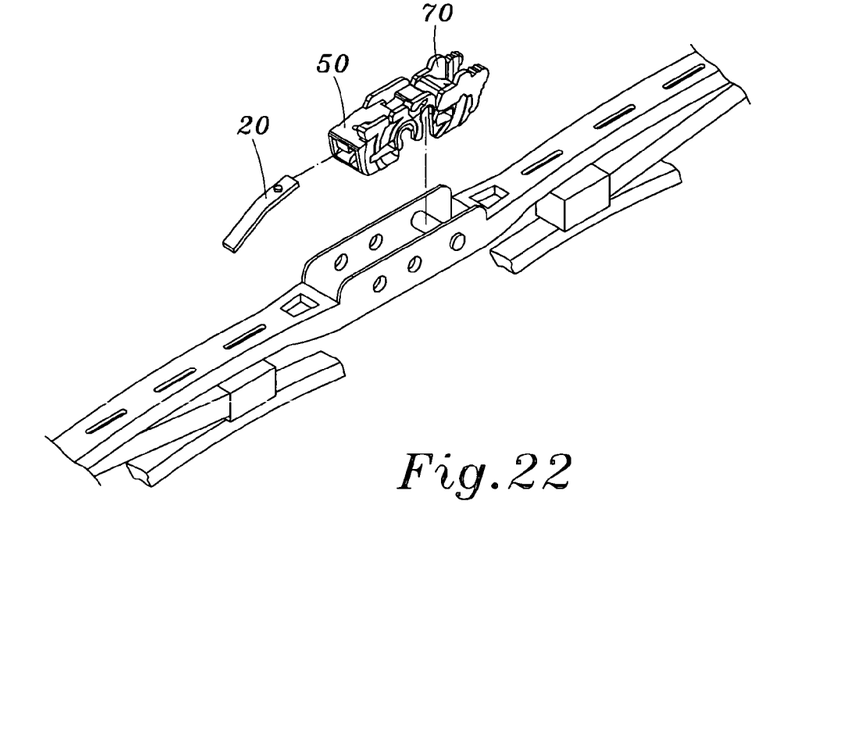
FIG. 22 shows a perspective view of the present invention along with an insertion-type windshield wiper connector.
Figure 23:
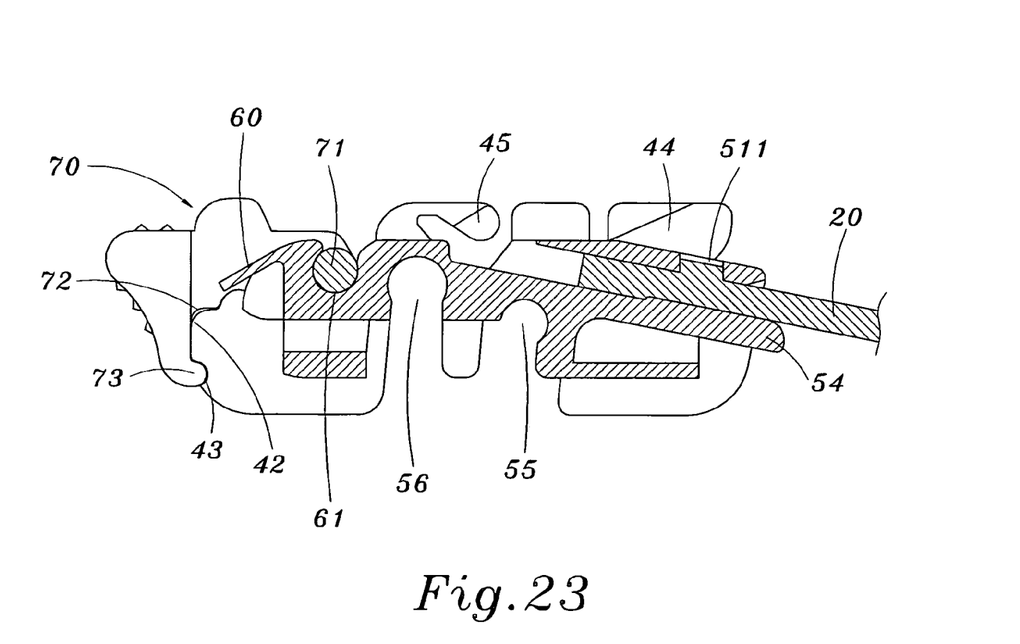
FIG. 23 shows a sectional view of the present invention engaging the insertion-type windshield wiper connector.
Figure 24:
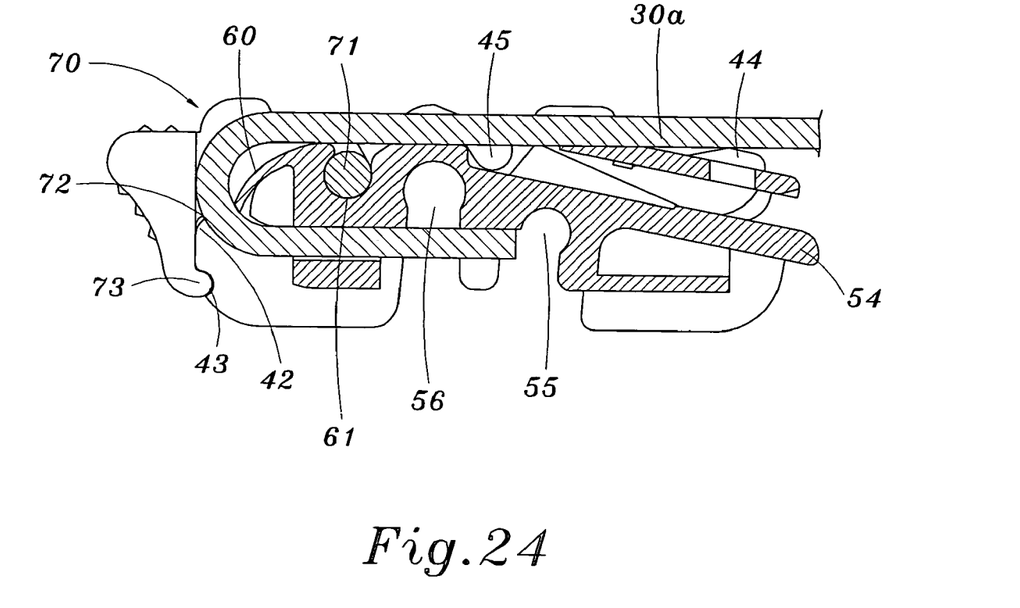
FIG. 24 shows a sectional schematic view of the present invention engaging a hook-type windshield wiper connector having the same thickness and a small curved end.
Figure 25:
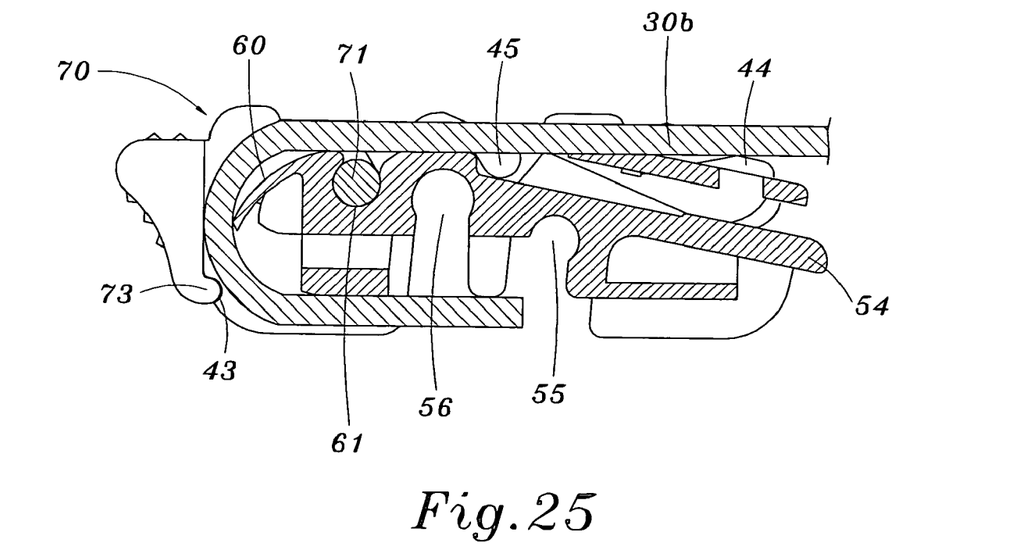
FIG. 25 shows a sectional schematic view of the present invention engaging a hook-type windshield wiper connector having the same thickness and a large curved end.
Figure 26:
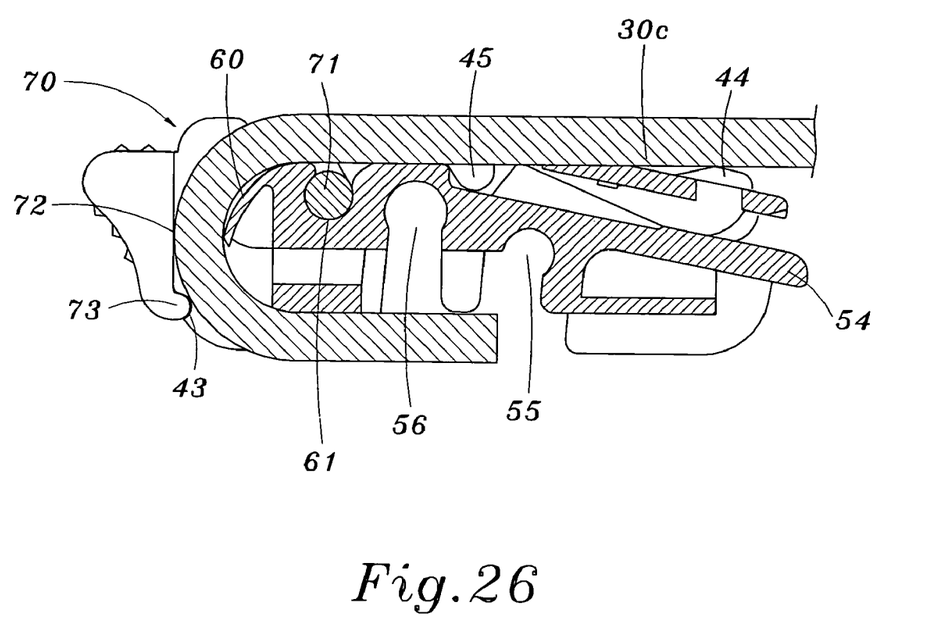
FIG. 26 shows a sectional schematic view of the present invention engaging a hook-type windshield wiper connector having a larger thickness and a large curved end.

As shown in FIG. 22, the present invention is engaged with the insertion-type connector 20.

The present invention described above is to be regarded in all respects as being illustrative and nonrestrictive. Accordingly, the present invention may be embodied in other specific forms without deviating from the spirit thereof. The present invention is therefore to be limited only by the scope of the following claim.

What is claimed is:

1. An automotive windshield wiper connection device comprising:

two side plates parallel to each other and each provided in the center of a bottom thereof with a pin hole and a locking slot;

a connection portion connecting said two side plates and provided at one end with an insertion-type elastic piece and at another end with a hook-type elastic piece, said insertion-type elastic piece being provided with an insertion hole, a retaining hole being located over said insertion hole, one of said side plates being provided with a first elastic pad located at one side of said retaining hole, and said one of said side plates being provided with a second elastic pad located over a place between said pin hole and said locking slot, said elastic pads extending above said connection portion in an un-flexed condition, said connection portion being provided with a cover fixing slot located in proximity of said hook-type elastic piece, said side plates each being provided with a protrusion and a recess located at an outer end thereof; and a cover having a cover pin by which said cover is pivotally engaged to said cover fixing slot, said cover being provided with a strength retaining point and a retaining point corresponding respectively to said protrusion and said recess of said connection portion;

whereby when a hook type windshield wiper arm is attached to the connection device the hook-type elastic piece is deflected toward the connection piece by a curved portion of the wiper arm, and each of the first and second elastic pads are deflected toward the connection piece by a flat portion of the wiper arm.

* * * * *